United States Patent Office.

IMPROVED COMPOSITION FOR MAKING SOAP.

NELSON ORCUTT, OF BINGHAMTON, NEW YORK.

*Letters Patent No. 60,041, dated November 27, 1866.*

SPECIFICATION.

TO ALL WHOM IT MAY CONCERN:

Be it known that I, NELSON ORCUTT, of Binghamton, in the county of Broome, and State of New York, have invented a certain new and useful Composition for Making Soap; and I do hereby declare that the following is a full, clear, and exact description and statement of the ingredients of such composition, of the proportions thereof, and of the manner of making soap from the same.

The ingredients of this composition are, 100 pounds of tallow or grease; 100 pounds of sal soda, or 35 pounds of soda ash; 60 pounds of resin; 4 pounds of starch; 20 pounds of wheat or rye flour; 1 pound of carbonate of ammonia; 1 pound of glue; 20 pounds of stone lime; 32 gallons of water.

In making soap from this composition, I put the tallow, soda, resin, glue, and ammonia in the kettle, and having slacked the lime with twenty gallons of hot water, I pour the liquid into the kettle on to the contents or ingredients therein. The starch and flour I put in twelve gallons of hot water, and add the mixture to the ingredients or articles in the kettle after they have been heated up to the boiling point, and are becoming united or formed into a soap. When common or coarse grease is used, it may be preferable to add to the other ingredients here named a small quantity of alum, and in some instances, where the soap is specially prepared for washing with hard water, a small quantity of borax may be added.

What I claim as my invention, and desire to secure by Letters Patent, is—

Making soap from untried or unrendered tallow or grease, and the other ingredients named, the ingredients being in the proportions stated.

This specification signed this 13th day of June, 1866.

NELSON ORCUTT.

Witnesses:
SOLOMON JUDD,
GEO. A. JUDD.